Oct. 23, 1923.

E. VOGES

INSECT TRAP

Filed Feb. 6, 1923

1,471,986

Inventor
E. Voges

Patented Oct. 23, 1923.

1,471,986

UNITED STATES PATENT OFFICE.

EDWIN VOGES, OF RIESEL, TEXAS.

INSECT TRAP.

Application filed February 6, 1923. Serial No. 617,314.

*To all whom it may concern:*

Be it known that I, EDWIN VOGES, a citizen of the United States, residing at Riesel, in the county of McLennan and State of Texas, have invented certain new and useful Improvements in Insect Traps; and I do hereby declare the following to be a full, clear, and exact description of the invention, such as will enable others skilled in the art to which it appertains to make and use the same.

The invention has for its primary object the provision of a trap for catching burrowing insects, such as ants, said trap being preferably constructed of sheet metal and thereby involving a cheap and light structure.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Corresponding and like parts are referred to in the following description and designated in both views of the drawings by like reference characters.

Figure 1:
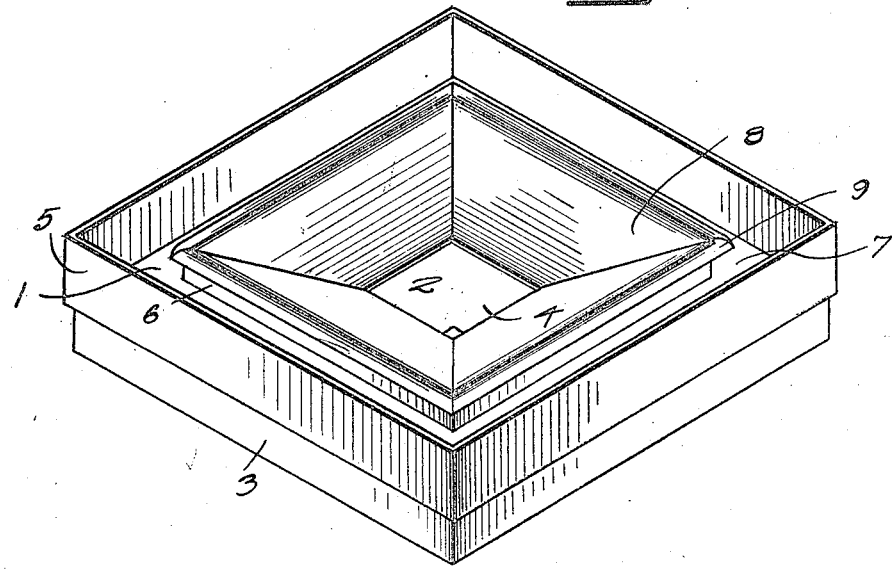
Figure 1 is a perspective view of an insect trap embodying the invention.
Figure 2:
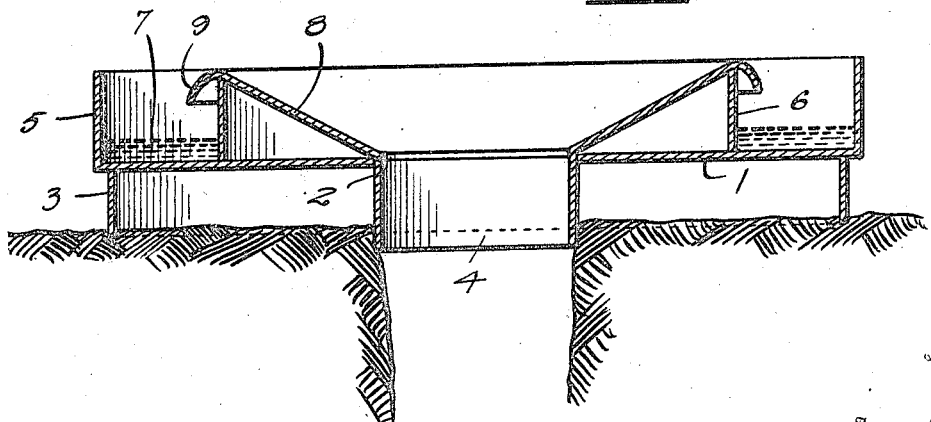
Figure 2 is a vertical section of the trap.

The trap comprises a plate 1 having a centrally disposed opening 2 and outer and inner depending rims 3 and 4 respectively, the inner rim 4 being in line with the opening 2. An upstanding rim 5 is disposed in line with the outer edge of the plate 1. A second upstanding rim 6 rises from the plate 1 some distance from the upstanding rim 5 and parallels the same and forms therewith a trough 7. A flared ring 8 is supported at its inner edge upon the plate 1 and near its outer edge upon the upstanding rim 6. The inner marginal portion of the flared ring 8 overhangs the opening 2 and the depending rim 4 and the upper, outer marginal portion of the flared ring 8 is outwardly and downwardly curved and overhangs the trough 7, as indicated at 9. The depending rim 3 is set inward from the upstanding rim 5 and, if preferred, may form a part thereof. The trap may have any preferred outline and, as shown, is of square form.

In practice, the trap is placed over an ant hill or burrow with the opening 2 in line with the burrow so that ants leaving the burrow pass through the opening 2 upon the flared ring 8 and when reaching the upper, outer edge of the latter drop into the trough 7 from which they cannot escape by reason of the steep and smooth walls and furthermore because it is preferred to supply said trough with a suitable insecticide, such as coal oil, which destroys the ant falling therein. The depending rims 3 and 4 are buried into the ground to any required depth to prevent the ant having an unobstructed passage beneath the plate 1 to and from the burrow.

What is claimed is:

1. A insect trap of the character specified, comprising a plate having a centrally disposed opening and provided upon its top side with a marginal trough, and having inner and outer rims depending from its bottom side, the inner rim being in line with the opening, and a flared ring supported at its inner edge upon the plate and overhanging the opening thereof and at its upper outer edge upon the inner upstanding wall of the trough with the upper outer portion of the ring outwardly and downwardly curved and overhanging the trough.

2. An insect trap of the character specified, comprising a plate having a centrally disposed opening, inner and outer rims depending from the plate, the inner rim being in line with the opening thereof and the outer rim adjacent the outer edge of the plate, inner and outer upstanding rims rising from the plate and disposed in parallel relation to form a trough, the outer upstanding rim being about in line with the outer edge of the plate, and a flared ring having its inner edge resting upon the plate and overhanging the opening thereof and having its upper outer edge outwardly and downwardly curved and engaging the upper edge of the inner upstanding rim and overhanging the trough formed between the inner and outer upstanding rims.

In testimony whereof I affix my signature in presence of two witnesses.

EDWIN VOGES.

Witnesses:
 OTTO RAU,
 L. C. HOLZE.